UNITED STATES PATENT OFFICE.

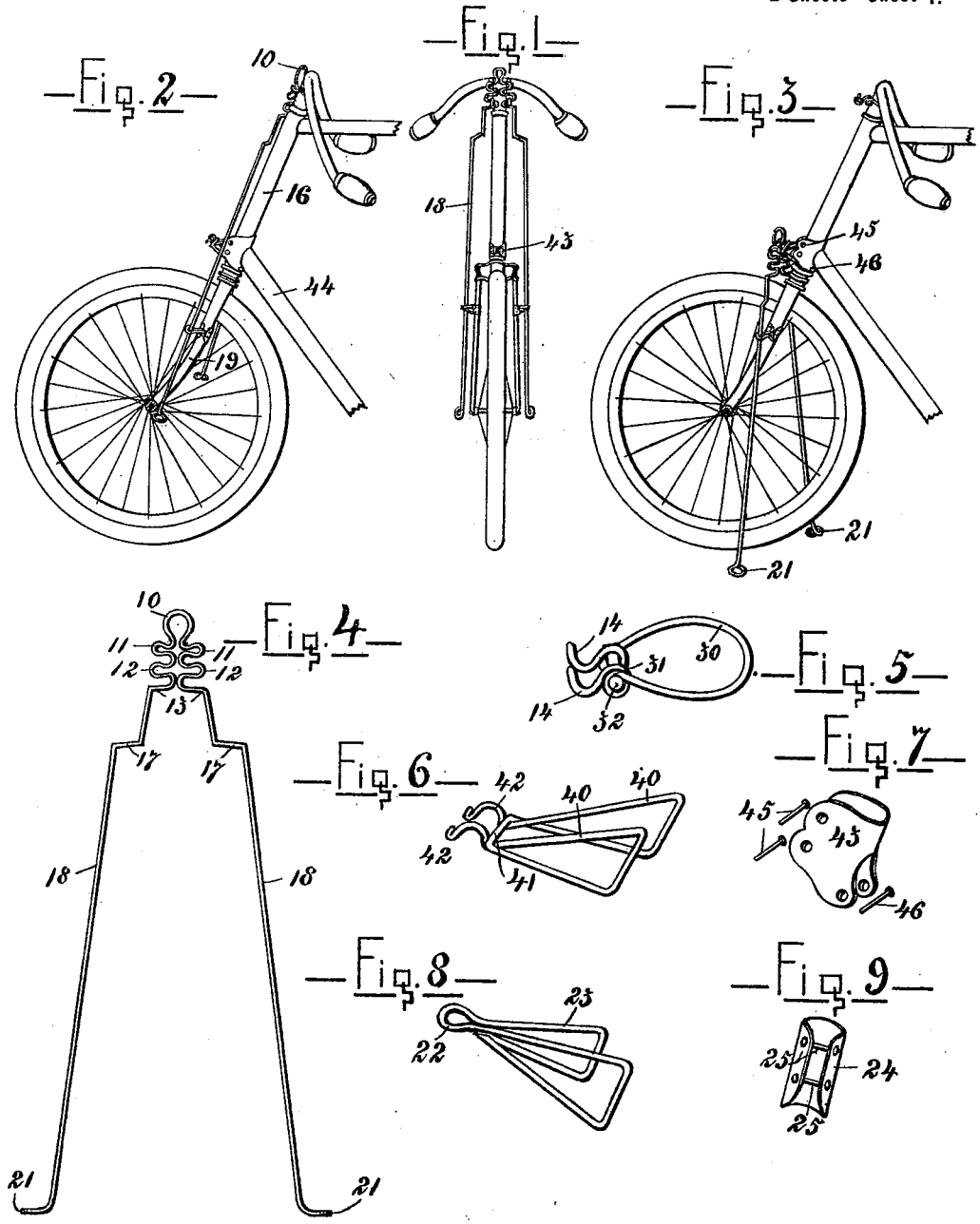

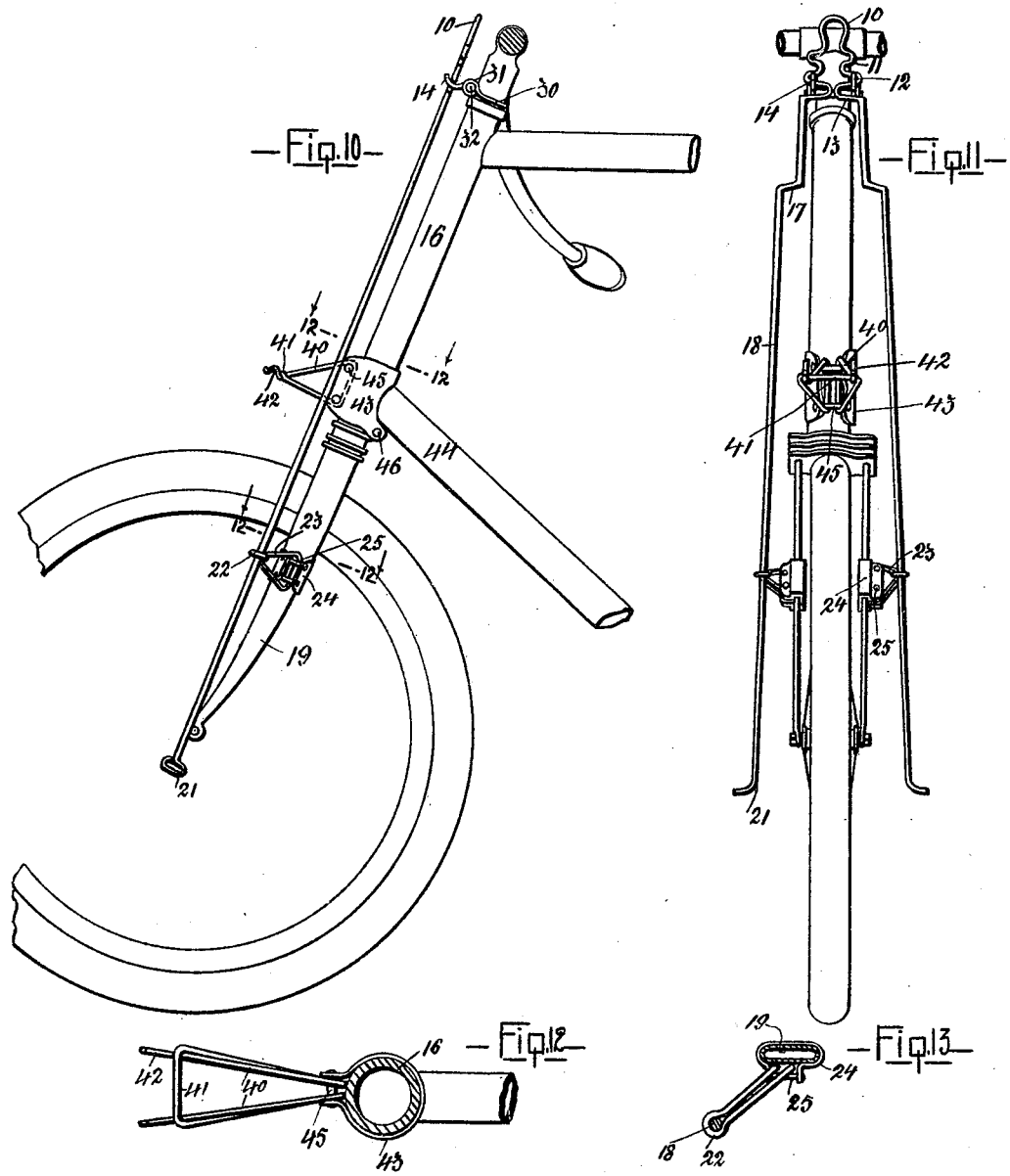

ALFRED BROWN, OF OTTAWA, CANADA, ASSIGNOR OF ONE-HALF TO ELIZA ANN McELROY, OF SAME PLACE.

BICYCLE-SUPPORT.

SPECIFICATION forming part of Letters Patent No. 634,439, dated October 10, 1899.

Application filed February 23, 1899. Serial No. 706,601. (No model.)

*To all whom it may concern:*

Be it known that I, ALFRED BROWN, of the city of Ottawa, in the county of Carleton and Province of Ontario, Canada, have invented certain new and useful Improvements in Bicycle-Supports; and I do hereby declare that the following is a full, clear, and exact description of the same.

My invention relates particularly to supports adapted to be carried by the bicycle; and it has for its object to provide a support that will be readily adjustable into or out of use and that will be very light in weight and simple and cheap to construct.

My improved support may be said briefly to consist of a single piece of steel wire bent into the form of a fork having its legs offset near the base and their ends offset at right angles and curved to present flattened feet, while said base is bent to form a loop or handle at its extremity and a series of oppositely-extending lateral projections adjacent thereto.

This support is supported when not in use and a bearing relation effected between the bicycle and the support when the latter is in use by a pair of bracket projections of novel construction.

For a full comprehension, however, of my invention reference must be had to the accompanying drawings, forming a part of this specification, wherein like symbols indicate the same parts, and in which—

Figure 1 is a front view of a bicycle with my improved support carried thereby and not in use. Fig. 2 is a side elevation thereof. Fig. 3 is a similar view and illustrating the support in use. Fig. 4 is a detail view of the forked portion of the support removed. Fig. 5 is a detail view of the bracket for supporting the forked portion when not in use; Fig. 6, a detail view of the bracket for effecting a bearing relation between the said forked portion and the bicycle when the support is in use; Fig. 7, a detail perspective view of the means for securing said last-mentioned bracket to the pedestal of the bicycle, Figs. 8 and 9 being detail views, respectively, of one of the guiding-brackets for the legs of the support and the means for securing said guiding-brackets to the front fork of the machine. Figs. 10 and 11 are enlarged side and front elevations, respectively, of a bicycle furnished with my invention; and Figs. 12 and 13 are horizontal sectional views taken on lines 12 12 and 13 13, Fig. 10.

In constructing my improved support I bend a piece of steel wire midway of its length to form a loop 10. I then form, also by bending, two pairs of oppositely-extending lateral finger projections 11 and 12, respectively, the pair 12 being located a short distance from the pair 11 and the wire being offset in opposite directions, as at 13, a short distance from the projection 12, in order to provide a space to receive the forwardly-projecting portion 14 of the supporting-bracket. The purpose of this offset is to accommodate the steering-head 16, while a further offset 17 a short distance from the last-mentioned offset enables the legs 18 of the support to straddle the front fork 19 of the bicycle-frame, and the ends of the legs are offset and horizontally curved to provide flattened feet 21. A pair of guiding-brackets are secured to the prongs of the fork 19 and serve the double purpose of guiding the legs of the support when being raised and lowered and depressing them into the smallest possible space when the support is not in use. These brackets are each constructed of a single piece of steel wire bent midway of its length to form a loop 22 to receive one of the legs 18, and a pair of triangular sides 23, the bases whereof are secured rigidly to one of the prongs of the fork 19 by a short open sleeve 24, taking around the prong, and a pair of pins 25, taking through the side edges of said sleeve and the said bases.

The bracket for carrying the support when not in use is formed from a single piece of steel wire bent to form a loop 30 to take around the steering-head 16 of the machine and coiled, as at 31, to receive a clamping-screw 32, and its ends 14 are curved upwardly and readily take beneath the projections 11 or 12, according to the height of the machine, as before mentioned.

The bracket for effecting a bearing relation between the machine and the forked supporting portion proper when the support is in use consists of a piece of steel wire bent to form a pair of triangular side pieces 40, a transverse bracing-piece 41, and having its ends curved downwardly, as at 42. This bracket is secured to the steering-head by a short open sleeve 43, having its lower middle portion cut away to accommodate the front end of the diagonal bracing-bar 44, the side edges thereof being connected rigidly to the bases of the triangular sides 40 by a pair of pins 45, and the corners formed by the cut-away portion being connected rigidly together by a pin 46. The bracket is so bent that its legs will have a natural tendency to spread apart, and it is therefore apparent that when lowered it will afford a most effective support, while the guiding-brackets will keep them in close proximity to the prongs of the fork 19 when raised and prevent their spreading too far apart when lowered, the loop 10 affording a finger-ring by which the support can be readily raised or lowered.

It is obvious that my novel construction of the support and its carrying and bearing brackets afford an exceedingly simple, light, and cheap support that is most effective.

The number of pairs of lateral projecting fingers 11 and 12 may be increased in number, if desired, and are for the purpose of allowing the support to be used in connection with bicycles having wheels of greater or less diameter, proportionately speaking, than that illustrated.

What I claim is as follows:

1. In a bicycle-support, the combination of a single piece of wire bent to form a pair of legs adapted to straddle the front fork of the bicycle; lateral projections formed at the upper end of said legs; a bracket secured rigidly to the steering-head of the machine near the upper end thereof to support said legs when not in use; a bearing-bracket secured rigidly to the steering-head near the lower end thereof to bear upon said lateral projections when the legs are in use; means for securing said bracket rigidly to said steering-head; and a pair of guiding-brackets secured to the prongs of the said front fork of the machine and adapted to guide the legs of the support when being raised or lowered, substantially as described and for the purpose set forth.

2. In a bicycle-support, the combination of a single piece of wire bent to form a loop, 10, a pair of projections 11, a pair of projections 12, and a pair of legs 18, offset and horizontally curved at their ends as at 21, and offset as at 13 and 17; a pair of guiding-brackets carried by the prongs of the fork and each consisting of a single piece of wire, bent to form a loop 22 and a pair of triangular sides 23; an open sleeve 24, taking around a prong and receiving the bases of said triangular sides 23, and a pair of pins 25 taking through said bases and into the edges of the sides of the opening in said sleeve; a supporting-bracket consisting of a single piece of wire bent to form a loop 30 to take around the upper end of the steering-head and coiled as at 31, with its ends 14 upwardly curved; a clamping-screw 32 for securing said supporting-bracket in place; and a bearing-bracket consisting of a single piece of wire bent to form a pair of triangular side pieces 40, a transverse bracing-piece 41 and having downwardly-curved ends 42; an open sleeve 43 taking around the steering-head near the lower end thereof and receiving the bases of said triangular sides, said sleeve having its lower middle portion cut away; and pins 45 and 46 for securing said bracket to said open sleeve and said sleeve to said steering-head all arranged and combined substantially as shown and described and for the purpose set forth.

In testimony whereof I have affixed my signature in presence of two witnesses.

ALFRED BROWN.

Witnesses:
 HERBERT BETTS,
 J. BISHOP.